May 2, 1939.  W. HEYNER ET AL  2,156,338

SCREW-THREADED CONNECTING MEANS

Filed Oct. 8, 1937

Patented May 2, 1939

2,156,338

UNITED STATES PATENT OFFICE 2,156,338

SCREW-THREADED CONNECTING MEANS

Willi Heyner and Hermann Henkel, Berlin-Neukolln, Germany

Application October 8, 1937, Serial No. 168,041
In Germany May 22, 1937

1 Claim. (Cl. 85—2.4)

Our invention relates to screw connections and more especially to means for fixing parts to thin plates, for instance plywood sheets, by means of screws.

The invention is more particularly concerned with means for providing such plates, or other articles such as rods, with metallic screw threading as required for instance in the construction of furniture, toys, etc.

According to this invention the internally threaded female part or nut is combined with a sleeve serving to fix it in a hole or perforation of the part to be connected, the fixing in place being effected by means of a tool of special design, as will hereinafter be described more fully with reference to the drawing affixed to this specification and forming part thereof, in which an embodiment of our invention is illustrated diagrammatically by way of example.

In the drawing:

Fig. 1 is an axial section of the female part or nut, while

Fig. 3 is an axial section showing the two parts illustrated in Figs. 1 and 2 connected with each other and fixed in a perforation of a wooden sheet, while

Figure 1:
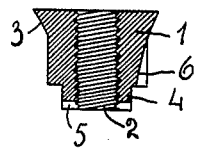
Figure 2:
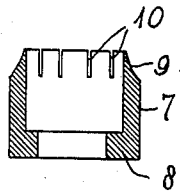
Fig. 2 is a similar view of the sleeve shaped part designed to cooperate with and to fix in place the nut in the sheet, rod or the like to be provided with screw threading.
Figure 3:
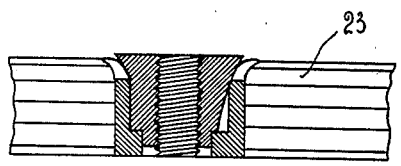

Referring to the drawing and first to Figs. 1 to 3, 1 is the nut and 2 is the internal screw thread formed thereon, while 3 is the gradually flaring head and 4 a projection of smaller diameter formed on the side of the nut opposite the head. 5 is a transverse notch formed in the projection 4 and 6 is a substantially axially extending notch which may be formed in the circumferential part of the nut.

7 is the sleeve, the inner diameter of which is slightly larger than the outer diameter of the main part of the nut 1. The extension 8 on one side of the sleeve 7 projects inwardly to the extent of closely fitting on the projecting part 4 of the nut. The other end of the sleeve is formed with flaring tongues 9 separated by narrow gaps or cuts 10.

Figure 4:
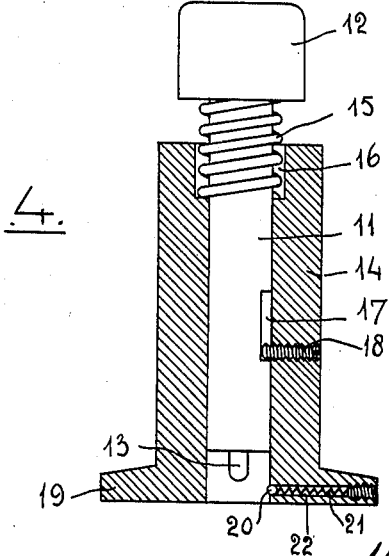
Fig. 4 is an elevation, partly in axial section, of the tool.

The nut and sleeve are fixed in a perforation of a wooden sheet by means of the tool shown in Fig. 4, in which 11 is a bolt formed with a head 12 at one end and a pin 13 at the other end, this bolt fitting in a sleeve 14 of substantially equal length and being supported with its head somewhat above the top end of the sleeve 14 by a coil spring 15 encircling the bolt 11 and resting with one end against the head 12 and with the other end against the bottom of a circular groove 16 formed in the top of the sleeve 14. 17 is an axially extending groove formed in the circumferential part of the bolt 11 and 18 is a set screw extending through a hole in the wall of sleeve 14 and projecting into the groove 17 to limit the stroke of the bolt 11. 19 is a flange surrounding the bottom end of the sleeve 14 and 20 is a spherical check, slightly projecting into the boring of the sleeve 14 and forced into operative position by a coil spring 21 inserted in a radial bore 22 in the flange 19.

In order to fix the parts 1 and 7 in the perforation of a plywood sheet 23, the nut 1 is inserted in the sleeve as shown in Fig. 3 and placed with its head foremost in the boring of the tool 14, the pin 13 serving to center it therein and the ball check 20 retaining the parts in the boring by projecting below the flaring head 3 of the nut. The tool being then placed above the perforation in the sheet of wood, a hammer blow delivered on the head 12 of the bolt 11 will force the nut into the sleeve, the flaring portion 3 of the head of the nut forcing the tongues 9 of sleeve 7 outwardly and thereby riveting the sleeve 7 to the sheet of wood. At the same time the sleeve 7 being upset by the blow will interlock with the nut 1 in that part of the wall material of the sleeve, in bulging inwardly, will enter the notch 6 formed in the nut, thereby retaining the nut in the sleeve.

We wish it to be understood that we do not desire to be limited to the exact details of construction shown and described for obvious modifications will occur to a person skilled in the art.

We claim:

Threaded metal member adapted for attachment to thin sheets, rods or the like, comprising in combination a metal sleeve, one end of said sleeve being thinned and slotted to form a circle of tongues and an internally threaded nut formed with an outwardly flaring head fitting in the sleeve and, below said head, with an axially extending notch adapted to form an interlocking connection between said nut and said sleeve, when this latter is upset by an axially directed hammer blow and part of the sleeve material enters said notch.

WILLI HEYNER.
HERMANN HENKEL.